United States Patent
Brown

(10) Patent No.: US 8,490,869 B2
(45) Date of Patent: Jul. 23, 2013

(54) PREDICTIVE AUTHORIZATION TECHNIQUES

(75) Inventor: Steven T. Brown, Franklin, WI (US)

(73) Assignee: Metavante Corporation, Jacksonville, FL (US)

(*) Notice: Subject to any disclaimer, the term of this patent is extended or adjusted under 35 U.S.C. 154(b) by 585 days.

(21) Appl. No.: 11/382,620

(22) Filed: May 10, 2006

(65) Prior Publication Data
US 2007/0262137 A1    Nov. 15, 2007

(51) Int. Cl.
*G06Q 10/10* (2012.01)

(52) U.S. Cl.
USPC ................................. 235/380; 705/35

(58) Field of Classification Search
USPC ............. 235/379, 380, 383; 705/10, 35, 38
See application file for complete search history.

(56) References Cited

U.S. PATENT DOCUMENTS

| | | | |
|---|---|---|---|
| 5,483,445 A | 1/1996 | Pickering | |
| 5,484,988 A * | 1/1996 | Hills et al. | 235/379 |
| 5,684,965 A | 11/1997 | Pickering | |
| 6,058,380 A | 5/2000 | Anderson et al. | |
| 6,519,576 B1 * | 2/2003 | Freeman | 706/21 |
| 6,754,640 B2 | 6/2004 | Bozeman | |
| 2002/0046161 A1 * | 4/2002 | Matsutani | 705/39 |
| 2002/0052852 A1 | 5/2002 | Bozeman | |
| 2002/0116331 A1 | 8/2002 | Cataline et al. | |
| 2002/0174006 A1 * | 11/2002 | Rugge et al. | 705/10 |
| 2002/0174069 A1 | 11/2002 | LaBadie et al. | |
| 2003/0004866 A1 * | 1/2003 | Huennekens et al. | 705/38 |
| 2003/0009402 A1 | 1/2003 | Mullen et al. | |
| 2003/0028457 A1 * | 2/2003 | Costa et al. | 705/35 |
| 2003/0055783 A1 | 3/2003 | Cataline et al. | |
| 2003/0074308 A1 | 4/2003 | Lawton et al. | |
| 2003/0158811 A1 | 8/2003 | Sanders et al. | |
| 2003/0208439 A1 | 11/2003 | Rast | |
| 2004/0019570 A1 * | 1/2004 | Bolle et al. | 705/64 |
| 2004/0083169 A1 | 4/2004 | Dentler et al. | |
| 2004/0088257 A1 * | 5/2004 | Wong et al. | 705/41 |
| 2004/0098338 A1 * | 5/2004 | Uehara et al. | 705/42 |
| 2004/0098353 A1 * | 5/2004 | Smith, III | 705/75 |
| 2004/0230526 A1 | 11/2004 | Praisner | |
| 2004/0236688 A1 | 11/2004 | Bozeman | |
| 2005/0177494 A1 | 8/2005 | Kelly et al. | |
| 2007/0100749 A1 * | 5/2007 | Bachu et al. | 705/42 |

\* cited by examiner

*Primary Examiner* — Daniel Hess
(74) *Attorney, Agent, or Firm* — Finnegan, Henderson, Farabow, Garrett & Dunner, LLP

(57) ABSTRACT

Methods and systems are provided for processing a transaction. An authorization request for the transaction is received over a financial network. The authorization request includes account information and transaction information specifying at least a transaction amount. A financial account is identified from the account information. A history of the financial account is analyzed to generate a prediction of a balance of the financial account at a specified future time. It is determined that the balance of the financial account at the specified future time will support the transaction for the transaction amount. An approval response is accordingly generated for the transaction.

32 Claims, 5 Drawing Sheets

| Date | Description | Deposit | Withdr'l | Balance |
|---|---|---|---|---|
| 2/08/06 | Weekly Pay | 500.00 | | 2142.68 |
| 2/10/06 | Utilities | | 150.22 | 1992.46 |
| 2/12/06 | Car Payment | | 342.50 | 1649.96 |
| 2/14/06 | Groceries | | 105.88 | 1544.08 |
| 2/15/06 | Weekly Pay | 500.00 | | 2044.08 |
| 2/17/06 | Mortgage | | 1244.62 | 799.46 |
| 2/20/06 | Insurance | | 142.55 | 656.91 |
| 2/22/06 | Weekly Pay | 500.00 | | 1156.91 |
| 2/24/06 | Charitable Donation | | 150.00 | 1006.91 |
| 2/27/06 | Clothing | | 127.45 | 879.46 |
| 3/01/06 | Weekly Pay | 500.00 | | 1379.46 |
| 3/05/06 | Newspaper Service | | 25.00 | 1354.46 |
| 3/08/06 | Weekly Pay | 500.00 | | 1854.46 |
| 3/10/06 | Utilities | | 124.07 | 1730.39 |
| 3/12/06 | Car Payment | | 342.50 | 1387.89 |
| 3/15/06 | Weekly Pay | 500.00 | | 1887.89 |
| 3/17/06 | Mortgage | | 1244.62 | 643.27 |
| 3/20/06 | Insurance | | 142.55 | 500.72 |
| 3/22/06 | Weekly Pay | 500.00 | | 1000.72 |
| 3/26/06 | Restaurant | | 108.75 | 891.97 |
| 3/29/06 | Weekly Pay | 500.00 | | 1391.97 |
| 4/03/06 | Dry Cleaning | | 35.00 | 1356.97 |
| 4/5/06 | Weekly Pay | 500.00 | | 1856.97 |
| 4/10/06 | Utilities | | 108.44 | 1748.53 |
| 4/12/06 | Car Payment | | 342.50 | 1406.03 |
| 4/12/06 | Weekly Pay | 500.00 | | 1906.03 |
| 4/12/06 | Clothing | | 224.56 | 1681.47 |
| 4/17/06 | Mortgage | | 1244.62 | 436.85 |
| 4/19/06 | Weekly Pay | 500.00 | | 936.85 |
| 4/20/06 | Insurance | | 142.55 | 794.30 |
| 4/23/06 | Airline Tickets | | 627.45 | 166.85 |
| 4/24/06 | Concert Tickets | | 72.00 | 94.85 |

Fig. 5A

| Date | Description | Payment | Charge | Balance |
|---|---|---|---|---|
| 5/01/06 | Payment | 800.00 | | 5822.23 |
| 5/10/06 | Restaurant | | 125.00 | 5947.23 |
| 5/11/06 | Restaurant | | 65.00 | 6012.23 |
| 5/15/06 | Interest | | 108.22 | 6120.45 |
| 5/17/06 | Health Club Membership | | 120.00 | 6240.45 |
| 5/22/06 | Clothing | | 225.46 | 6465.91 |
| 5/23/06 | Monthly Parking | | 185.00 | 6650.91 |
| 5/26/06 | Electronics Store | | 224.44 | 6875.35 |
| 6/01/06 | Payment | 4000.00 | | 2875.35 |
| 6/04/06 | Airline Tickets | | 1245.78 | 4121.13 |
| 6/05/06 | Car Rental | | 264.78 | 4385.91 |
| 6/05/06 | Restaurant | | 45.00 | 4430.91 |
| 6/05/06 | Hotel | | 189.00 | 4619.91 |
| 6/15/06 | Interest | | 83.16 | 4703.07 |
| 6/17/06 | Health Club Membership | | 120.00 | 4823.07 |
| 6/19/06 | Hockey Tickets | | 400.00 | 5223.07 |
| 6/21/06 | Restaurant | | 254.00 | 5477.07 |
| 6/23/06 | Monthly Parking | | 185.00 | 5662.07 |
| 7/08/06 | Payment | 125.00 | | 5537.07 |
| 7/15/06 | Interest | | 99.67 | 5636.74 |
| 7/17/06 | Health Club Membership | | 120.00 | 5756.74 |
| 7/23/06 | Monthly Parking | | 185.00 | 5941.74 |
| 7/28/06 | Payment | 2500.00 | | 3441.74 |
| 8/15/06 | Interest | | 61.95 | 3503.69 |
| 8/17/06 | Health Club Membership | | 120.00 | 3623.69 |
| 8/23/06 | Monthly Parking | | 185.00 | 3808.69 |
| 8/28/06 | Jewelry | | 5850.00 | 9658.69 |
| 9/10/06 | Payment | 1000.00 | | 8658.69 |
| 9/15/06 | Interest | | 155.86 | 8814.55 |
| 9/16/06 | Electronics Store | | 724.25 | 9538.80 |
| 9/17/06 | Health Club Membership | | 120.00 | 9658.80 |
| 9/23/06 | Monthly Parking | | 185.00 | 9843.80 |

Fig. 5B

PREDICTIVE AUTHORIZATION TECHNIQUES

BACKGROUND OF THE INVENTION

This application relates generally to predictive techniques. More specifically, this application relates to the application of predictive techniques to transaction authorization.

Different consumers have different ways of handling their finances. Some consumers are diligent about keeping ample balances in their checking accounts, and only writing checks for payment to others that are below their known balance. Other consumers rely on float that is inherent in financial payment systems to ensure that there are sufficient funds in their account at the time that funds will be collected from the account. That is, such a consumer might write a check for an amount that is greater than the balance of his account at the moment he writes the check, but that he knows will not be subject to recovery efforts for several days. The consumer anticipates that certain funds expected to be deposited in the account will arrive before an attempt is made to recover funds from the account. The delay in attempting to recover finds from the account may be a result of mailing delays in those cases where the check is mailed and/or a result of inherent delays in the settlement process used by merchants and financial institutions. The check amount during the time it remains uncollected is referred to in the art as "float."

Reliance on this type of float by consumers has a consequent risk that the delay in attempting to recover funds may turn out to be less than the consumer is expecting. To mitigate against the possibility of the check being declined for insufficient funds, such consumers often subscribe to overdraft-protection services so that the check will be honored. Such overdraft-protection services are generally costly to the consumer.

More recently, advances in settlement techniques have also generally shortened the float time inherent in these financial payment systems. For example, recent efforts at using check images have permitted electronic communication of check information that has resulted in decreases of check clearing time. This has also been a consequence of the recent adoption of new rules governing accounts receivable conversion ("ARC"), which is a service that allows consumer check payments to be sent to a lockbox or dropbox location for conversion into an Automated Clearing House ("ACH") electronic debit. Similarly, recent implementations of point-of-sale check truncation have also reduced clearing time.

The effect of such reductions in clearing time have an impact on the financial practices of those who traditionally rely on float time. It is desirable to have a mechanism that would permit such individuals to continue with their financial practices without adverse impact from advances in settlement techniques.

BRIEF SUMMARY OF THE INVENTION

Embodiments of the invention address this need in the art by making use of predictive techniques in performing authorizations of transactions. Rather than deny a transaction because a current balance of an account is insufficient, the predictive techniques will determine what balance is anticipated at a future time when the transaction is to be settled. By basing decisions whether to authorize or deny transactions on such predictions advantageously permits certain customers to continue with practices of relying on float time, even when performing real-time transactions.

Thus, in a first set of embodiments, a method is provided for processing a transaction. An authorization request for the transaction is received over a financial network. The authorization request includes account information and transaction information specifying at least a transaction amount. A financial account is identified from the account information. A history of the financial account is analyzed to generate a prediction of a balance of the financial account at a specified future time. It is determined that the balance of the financial account at the specified future time will support the transaction for the transaction amount. An approval response is accordingly generated for the transaction.

In some instances, a balance of the financial account at the time of receiving the authorization request is insufficient to support the transaction for the transaction amount.

In different embodiments, different types of financial accounts may be used. For example, in some cases, the financial account comprises a debit account, with the determined balance of the financial account at the specified future time being greater than or equal to the transaction amount. For instance, the transaction might comprise payment using a check drawn on the financial account. The account information could include an account number obtained by reading a magnetic-ink character-recognition ("MICR") line from the check. Analysis of the history of the financial account could include an analysis of records of deposits made to the financial account over a period of time to identify deposit trends. Also, the analysis of the history of the financial account could include an analysis of records of withdrawals made from the financial account over a period of time to identify withdrawal trends from the financial account.

In other cases, the financial account comprises a credit account, with a difference between a credit limit of the credit account and the determined balance of the financial account at the specified future time being greater than or equal to the transaction amount. Analysis of the financial account could thus comprise an analysis of records of payments made to reduce the balance of the financial account to identify payment trends to the financial account. Analysis of the financial account could additionally or alternatively include an analysis of records of charges made to increase the balance of the financial account to identify charging trends to the financial account.

The specified future time may sometimes comprise a time interval. The prediction of the balance of the financial account at the specified future time might thus comprise a prediction of a minimum balance of the financial account over the time interval. The predication of the balance of the financial account at the specified future time may also sometimes comprise an estimate of a reliability of the prediction.

An example of a transaction that may be processed in this way is a transaction between a customer and a merchant for a purchase by the customer from the merchant. In such an example, the authorization request may be received over the financial network from a merchant system controlled by the merchant. The method may also further comprise transmitting the approval response to the merchant system over the financial network. In one embodiment, the approval response is transmitted over the financial network with a services application related to the financial account.

In a second set of embodiments, a method is provided for taking an action with respect to a financial object. A model of at least one characteristic of the financial object is generated over time from historical information of the financial object. Input data defining a potential action to be taken with the financial object are received. A future state of the characteristic of the financial object is determined using the generated model. An effect of the potential action is determined by applying the input data to the determined future state of the characteristic of the financial object. Whether to take the potential action is accordingly decided in accordance with the determined effect of the potential action.

The financial object may comprise a financial account. In some such instances, the characteristic of the financial object comprises a balance of the financial account and the future state of the characteristic comprises a predicted balance of the financial account. The historical information may comprise a record of deposits of funds to the financial account and/or a record of withdrawals of funds from the financial account. The potential action may comprise approval of a transaction to be supported by the financial account.

The methods of the present invention may be embodied in a transaction processing system having a communications device, a processor, a storage device, and a memory coupled with the processor. The memory comprises a computer-readable medium having a computer-readable program embodied therein for directing operation of the transaction processing system. The computer-readable program includes instructions for operating the transaction processing system in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 5A and 5B are examples of account histories on which predictive authorization techniques of the invention may be applied.

DETAILED DESCRIPTION OF THE INVENTION

Embodiments of the invention make use of predictive techniques in estimating a balance of an account at a future time. The future time may correspond to an anticipated time when funds are to be collected from the account, and the estimation of its balance at that future time may form a basis for authorizing a transaction to be supported by the account. Estimation of the future account balance is governed by a rules-based formalism that may accommodate different account types and different future payment windows, in addition to accommodating different levels of risk to be accepted by different financial institutions. For example, both credit and debit types of accounts may be accommodated in different embodiments of the invention. The rules-based formalism permits participating financial institutions to set parameters that define risk tolerance on a global basis, an individual-account basis, or using an intermediate form of assignment that considers various factors in grouping accounts. It will be understood that there is some level of risk in the use of a predictive technique that there will be an unexpected deviation by an account holder from past practices. Techniques may be used to quantify this level of risk and some financial institutions may be willing to accept greater levels of risk than other financial institutions; similarly, a single financial institution may be willing to accept a greater level of risk with some of its customers than it is willing to accept with other customers depending on the total relationship the financial institution has with those customers.

Figure 1:
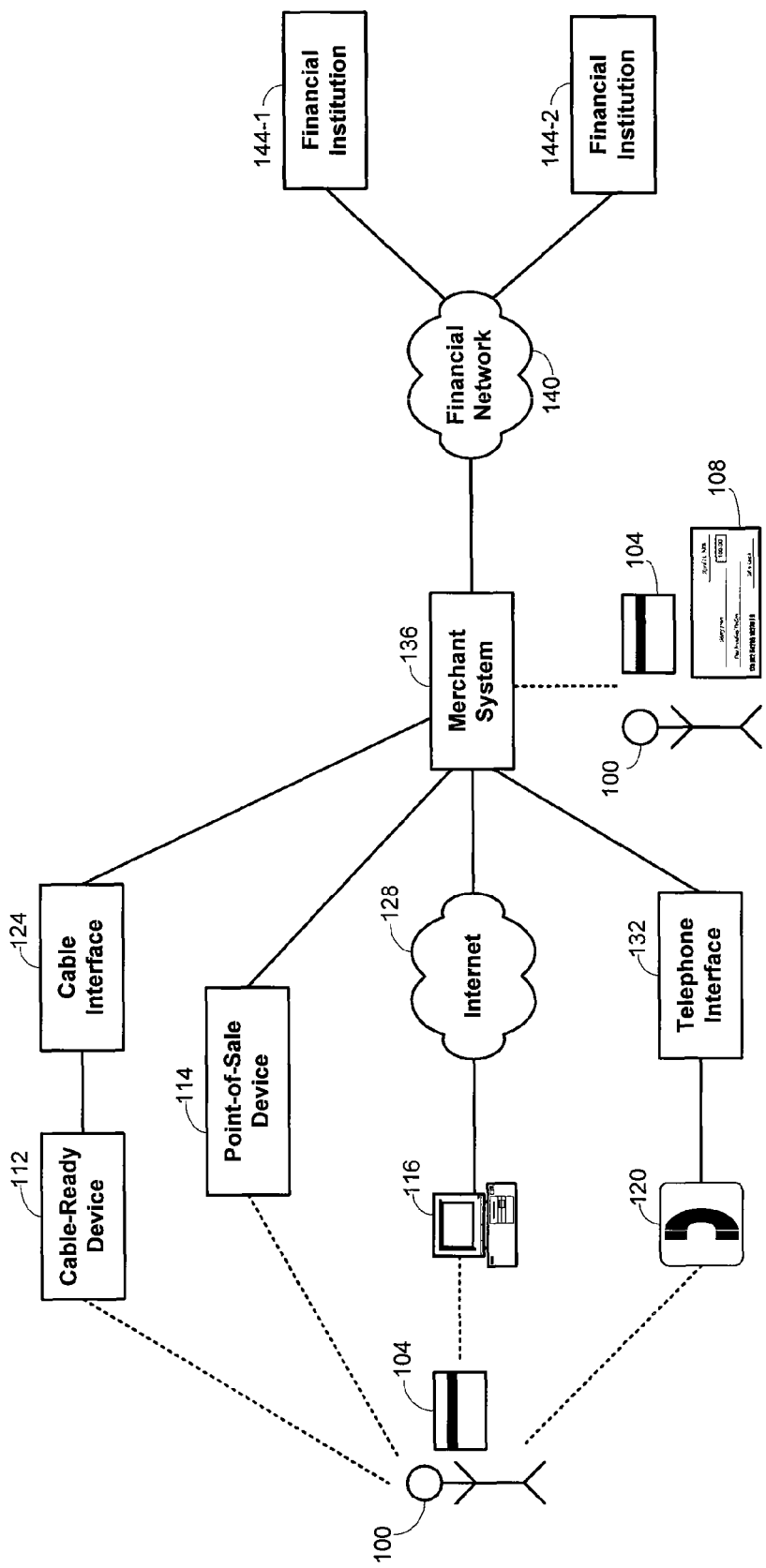
FIG. 1 is a schematic diagram illustrating an architecture that may be used with embodiments of the invention.

An overview of an architecture in which embodiments of the invention may be implemented is illustrated with the schematic drawing of FIG. 1. For purposes of illustration, the following description of the drawing focuses on embodiments in which a transaction is executed between a customer 100 of a financial institution 144 and a merchant, but it will be appreciated that the invention is not limited by any particular characteristics of the parties to the transaction. The drawing shows that interactions between the customer 100 and the merchant in staging a transaction may take a variety of different forms. For example, a customer 100 might interact directly with a merchant who employs a clerk that provides data to a merchant system 136 that forms part of the overall architecture. Such direct customer-merchant interactions generally permit a wide array of different payment mechanisms to be used in supporting a transaction—the examples shown in the drawing include a check 108 and a debit card 104, which are used in the following description to illustrate the use of predictive techniques on debit and credit types of accounts respectively. Other types of payment instruments may be used in other embodiments, although such alternative payment instruments are expected to have payment mechanisms that parallel the debit or credit payment mechanisms described in detail herein. Examples of such alternative payment instruments include loyalty cards and ACH cards, among others. Collection of information from a debit card 104 or check 108 may use a magnetic-stripe reader, a magnetic-ink character reader, a smart-card chip reader, a bar code reader, an optical-character-recognition device, a radio-frequency reader for reading radio-frequency identification devices ("RFID") or the like, depending on the specific structure and form of the debit card 104 or check 108.

Another form of direct interaction that be used in certain embodiments is during a transaction when the customer 100 is physically present at a point of sale. In such embodiments, a point-of-sale device 114 may be used as an interface between the customer 100 and the merchant system 136. Sometimes the point-of-sale device 114 may be operated directly by the customer as a self-service device, while in other instances, the point-of-sale device 114 is operated by a clerk employed by the merchant.

In addition to direct interaction of the customer 100 with a merchant, there are various remote mechanisms that the customer might alternatively use. Currently, these remote mechanisms focus primarily on the use of credit payment mechanisms, as the drawing suggests. But efforts are being made in the art to improve the use of debit payment mechanisms in executing remote transactions and embodiments of the invention are equally applicable to the use of such remote-transaction debit payment mechanisms. One remote transaction mechanism may use the Internet 128 to permit an exchange of information between a customer 100 and a merchant system 136. The customer 100 interacts with a personal computer 116 or other computational device to access web pages produced by the merchant system 136 over the Internet 128. These web pages permit the customer 100 to review merchandise, indicate a selection, and provide information from the payment instrument to the merchant system 136. Similar information may be provided with a telephone interface 132 when the customer 100 uses a telephone, either to speak directly with a customer-service agent of the merchant or to provide information through the use of dual-tone multiple-frequency ("DTMF") tones. A cable interface 124 coupled with a cable-ready device 112 that the customer 100 interacts with may provide similar functionality.

Irrespective of how the merchant system 136 acquires account and other information from the customer 100, it may use a connection with a financial network 140 to route account information to an appropriate financial institution 144 in seeking authorization for the transaction. The account information is drawn from the payment instrument 104 or 108, either directly or by obtaining information from the customer 100, and is used by the financial network 140 and financial institution 144 to identify the specific account to be used to support the transaction. As explained below, the financial institution 144 may then use predictive techniques in determining whether to return an approval or denial of the authorization request.

It will be appreciated that the architecture shown in FIG. 1 enables real-time ACH transactions to be executed when a customer 100 pays by check 108. Merely by way of example, such real-time transactions may result from the merchant system 136 using a magnetic-ink reader to read a MICR line from the check 108 to extract an American Banking Association ("ABA") routing number and demand-deposit account ("DDA") number. The financial network 140 uses the ABA routing number to identify the financial institution 144 that maintains the account and the financial institution 144 uses the DDA number to identify the specific account. The routing of such authorization requests is thus similar to conventional debit-card transactions in which a Bank Identification Number ("BIN") and account number are read by the merchant system 136 from a magnetic stripe on the back of a debit card.

The predictive authorization techniques used by the financial institution 144 in authorizing a transaction may be considered as an example of the application of control theory to financial transactions. Control theory is a formalism in which an algorithm receives a number of inputs, which may then be weighted to provide a predictive result. In certain embodiments of the invention, the inputs include historical records of activity on a particular financial account and information defining characteristics of a proposed transaction. The predictive result is an estimated balance of the account at a future time.

There are a wide variety of different classes of algorithms that may be applied by the financial institution 144 in different embodiments, ranging from relatively simple algorithms that merely average past deposit trends to estimate whether a deposit will be made before the future time to sophisticated algorithms that use varied information and include an estimate of risk as part of the predictive result. Risk could be quantified in a variety of different ways, including statistical measures like standard deviation or the imposition of confidence restrictions. For instance, one predictive model could use the input information to determine that an account balance on a particular date will be \$ $X \pm Y$, where Y is some measure of statistical variance, i.e. the standard deviation, the mean deviation, a nonunity Z-score range, etc. Parameters set by the financial institution could define the type of variance measure to be used. In another instance, a predictive model could use the input information to determine that at a C % confidence level, the account balance on a particular date will exceed \$ W. Parameters set by the financial institution 144 could define the confidence level C to be applied. In addition, rather than predict a balance on a given day, the predictive models could predict the balance over a time period. In such embodiments, a prediction of an account balance of \$ $X \pm Y$ could have a Y measure that reflects the anticipated volatility of the account balance over the time period, in addition to reflecting the uncertainty in the prediction. A prediction made to a defined confidence level could reflect a determination that a balance throughout the time period will always exceed a value \$ W over the time period or that the balance at some moment within the time period will exceed a value \$ W. Still other ways of presenting the predictive result will be evident to those of skill in the art.

The particular algorithms that are used may generally be drawn from the wide class of algorithms used in control theory. Merely by way of example, neural-network models might be used in which actual account balances as they occur are compared with former predictions to generate feedback in reconfiguring the neural network. Such feedback models provide a useful and effective mechanism for continued improvement in the modeling techniques that are used. Furthermore, fuzzy logic evaluations may be incorporated into the algorithmic models, reflecting the uncertainty inherent in the way determinations are made. Other artificial-intelligence models like expert systems, Bayesian networks, and the like could be used in different embodiments.

Figure 2:
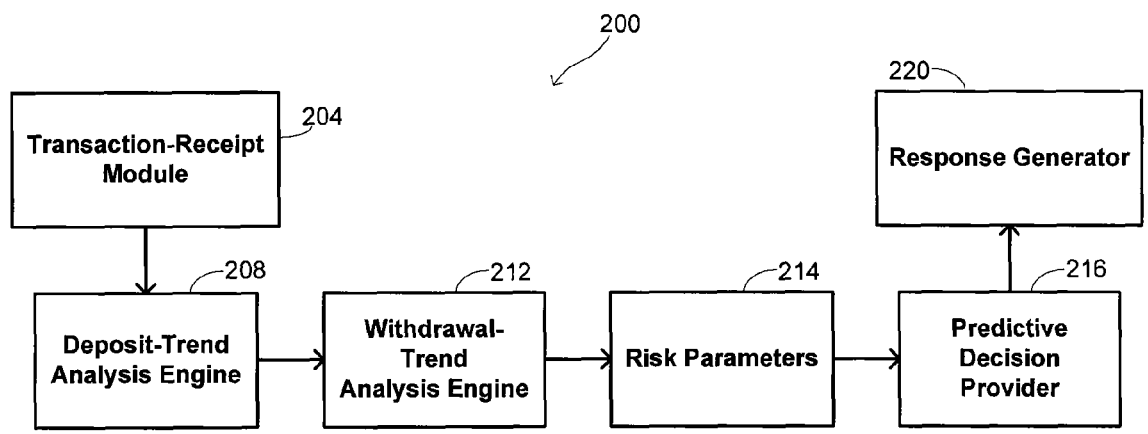
FIG. 2 provides a schematic illustration of functional elements that may be used for predictive authorizations in embodiments of the invention.

Whichever specific predictive modeling techniques are used, they may be implemented used a series of functional modules like those illustrated schematically in FIG. 2. The series 200 begins with a transaction-receipt module 204 that receives particulars of the transaction being proposed—such data as the amount of money defining the size of the transaction, an identity of the recipient, the date, and the like. A deposit-trend analysis engine 208 and a withdrawal-trend analysis engine 212 respectively perform evaluations of patterns by which funds are credited to and debited from the account over time. Such evaluations may identify not only average amounts that are deposited over time, but specific trends that identify persistent patterns of when funds are credited or debited, the amounts that are credited or debited, and the like. In addition, such evaluations may identify how regular such crediting and debiting is—e.g., is the same amount always deposited on the same date of the month or is an amount that varies ±50% deposited within some number of days of a specific monthly date?

The results derived by the deposit-trend analysis engine 208 and the withdrawal-trend analysis engine 212 are combined with risk parameters 214, which may be defined on different bases in different embodiments as described above. The collection of information is provided to a predictive decision provider 216 with the transaction details extracted by the transaction-receipt module. The predictive decision provider 216 combines the information it receives to generate a prediction of the account balance at the relevant date, perhaps subject to certain risk quantifications. A rules-based algorithm implemented by a response generator 220 compares the predicted balance with the transaction details to determine what type of response to generate to the authorization request. Different rules may be applied in different embodiments. For example, in a simple embodiment, the authorization request might be approved merely upon a determination that the predicted balance will exceed the transaction amount at the relevant time. In other instances, more sophisticated rules might be applied to mitigate risk to the financial institution 144. For instance, if the predictive result includes a predicted value and quantified variance of the form \$ $X \pm Y$, the response generator 220 might generate a denial whenever the transaction amount exceeds X−Y, reflecting a judgment that the uncertainty is too great. Other embodiments might generate a denial only when the transaction amount exceeds X−αY for some value of α, such as α=0.1, 0.2, 0.5, etc., reflecting a greater willingness to tolerate some uncertainty in the result. In embodiments where a confidence level is imposed to generate a prediction that the account balance will exceed a value $ W to that confidence level, the response generator 220 might generate a positive response when the transaction amount is less than W, but might impose a cushion in other instances by generating a positive response only when the transaction amount is less than (1−β) W, for some value of β, such as β=0.1, 0.2, 0.5, etc. Still other variations on rules that might be implemented in different embodiments to discriminate between generation of approval and denial responses will be evident to those of skill in the art.

Figure 3:
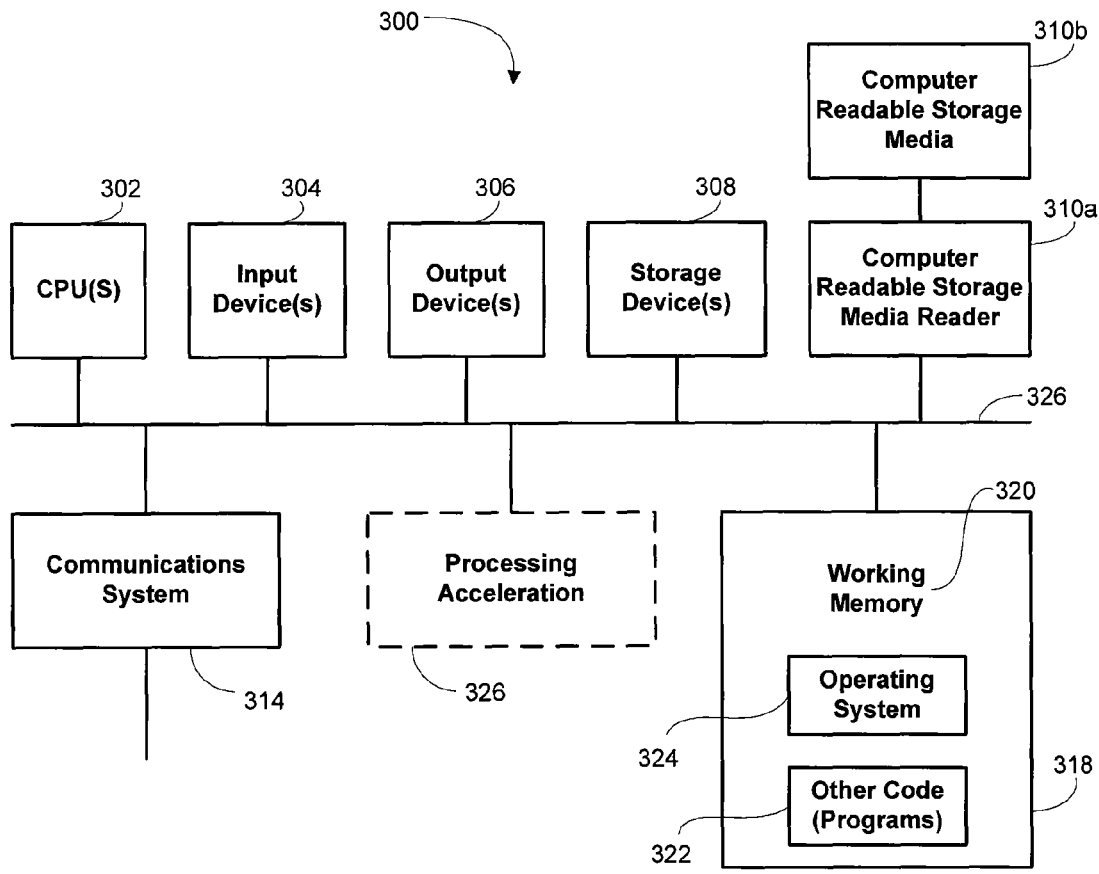
FIG. 3 is a schematic diagram of a computational device on which methods of the invention may be embodied.

FIG. 3 provides a schematic illustration of a structure that may be used to implement a computational device 300 implementing embodiments of the invention. FIG. 3 broadly illustrates how individual system elements may be implemented in a separated or more integrated manner. The computational device 300 is shown comprised of hardware elements that are electrically coupled via bus 326, including a processor 302, an input device 304, an output device 306, a storage device 308, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged over the architecture described in connection with FIG. 1.

The computational device 300 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 4:
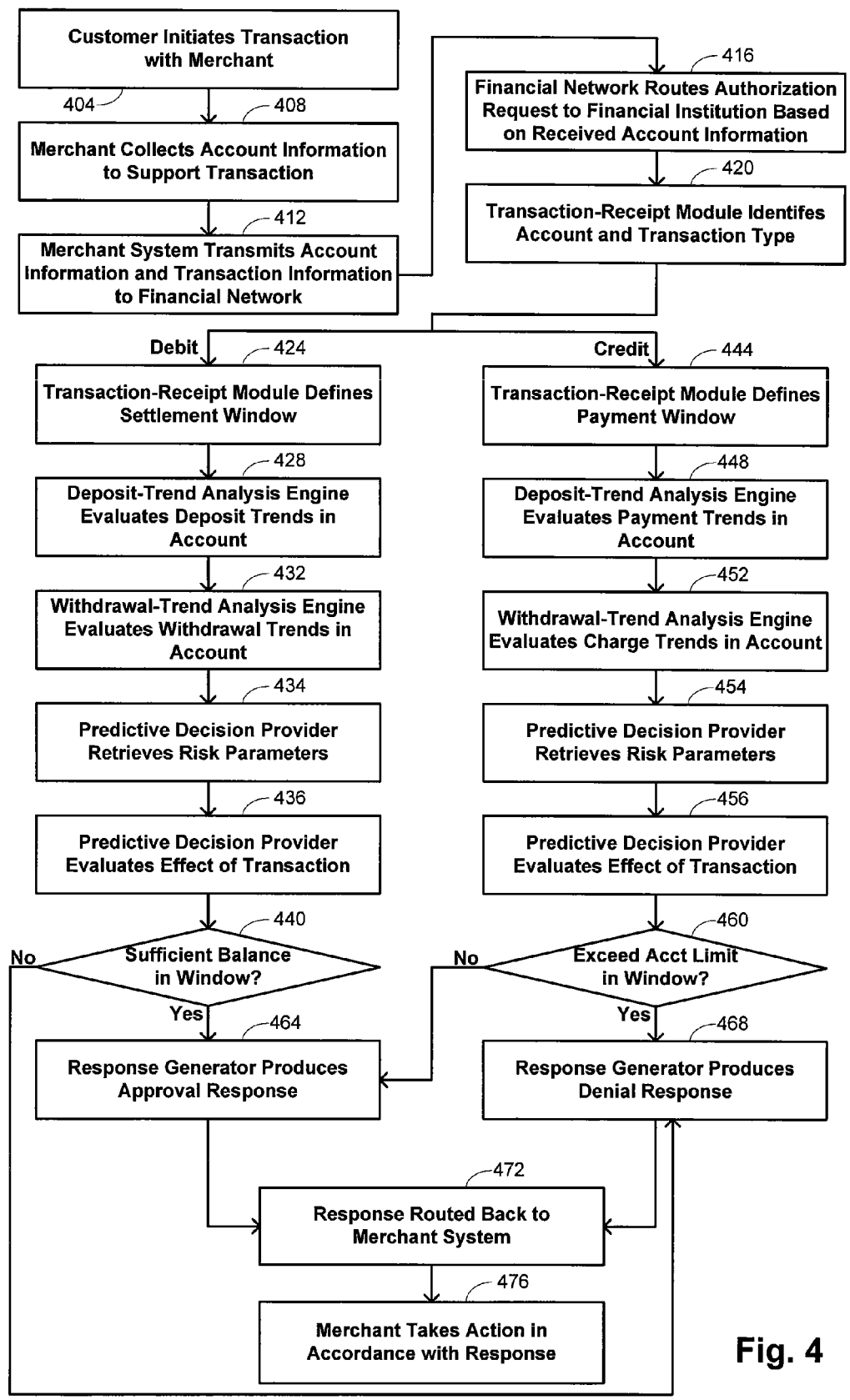
FIG. 4 is a flow diagram that summarizes methods of the invention in various embodiments.

A summary of how transactions may be approved using predictive techniques is illustrated for both credit and debit accounts with the flow diagram of FIG. 4. A debit account is an account in which funds are held by a financial institution 144 on behalf of a customer 100. The balance of the account thus reflects the value of funds that the customer 100 is entitled to. A credit account is an account in which funds may be paid by the financial institution 144 on behalf of a customer 100 and subject to repayment by the customer 100, perhaps with an additional service charge or interest charge. The balance of the account thus reflects the value of funds that have been extended on a credit basis to or on behalf of the customer 100. Usually such credit accounts include a credit limit so that the level of funds available to the customer 100 is the difference between the credit limit and the account balance.

At block 404 of FIG. 4, a transaction is initiated between a customer 100 and a merchant. Initiation of such a transaction may be by any mechanism, including the in-person, Internet, telephone, and cable mechanisms described in connection with FIG. 1. Initiation of a transaction prompts the merchant to collect account information to support payment for the transaction at block 408. Collection of such account information may be by reading information from a presented payment instrument like a debit card 104 or check 108, or by receiving a transmission from a remote customer 100 of the relevant information. The information collected by the merchant is provided to the merchant system 136, either directly as a result of the structure of a remote transaction or by the input of data by either a representative of the merchant or the customer 100 herself.

Before acting on the transaction, the merchant seeks an authorization response that confirms the willingness of the financial institution 144 to make payment in accordance with terms associated with the payment instrument. Accordingly, at block 412, the merchant system 136 transmits the account information collected at block 408 with transaction information to the financial network 140. The financial network 140 identifies the financial institution 144 that maintains the financial account to be used in supporting the transaction from the account information at block 416 and routes an authorization request to that financial institution 144. The transaction-receipt module 204 receives the authorization request and identifies the financial account and the type of transaction at block 420.

Application of the predictive techniques is illustrated respectively by the left and right columns of the drawing for debit and credit accounts. As indicated at block 424, the transaction-receipt module 204 defines a settlement window appropriate for the type of debit transaction to be executed. For example, in cases where the payment instrument is a check 108, the settlement window could be one day, could be two days, could be thirty-six hours, or some other time period that the financial institution 144 has judged is appropriate for settlement of a check. The deposit-trend analysis engine 208 performs an analysis of deposit records for the identified financial account at block 428 to identify deposit trends. Similarly, the withdrawal-trend analysis engine 212 performs an analysis of withdrawal records of the identified financial account at block 432 to identify withdrawal trends. The predictive decision provider 216 retrieves relevant risk parameters at block 434 and evaluates the effect of the transaction on the account balance at block 436 such as by using any of the techniques described above or by using other techniques. If a sufficient balance is predicted to be in the account at the future time in accordance with that evaluation, and as checked at block 440, then the response generator 220 produces an approval response at block 464. If instead, the determination is that the authorization request should be denied, the response generator 220 produces a denial response at block 468.

A similar process is used for the consideration of authorization requests for credit transactions, although the application differs somewhat because of the different characteristics of a credit account. At block 444, the transaction-receipt module 204 defines a payment window for the credit account, in this instance reflecting a determination by the financial institution 144 of a time period within which payment by the financial institution 144 to the merchant will be expected. For example, in cases where the payment instrument is a debit card 104, the payment window could be three days, could be two days, or some other time period. The deposit-trend analysis engine 208 evaluates payment trends by the customer 100 to the account at block 448 and the withdrawal-trend analysis engine 212 evaluates trends observable for charges made by the customer 100 to the account at block 452. The results of these analyses are used by the predictive decision provider with risk parameters retrieved at block 454 to evaluate the effect of the transaction on the account at block 456. A decision is made at block 460 whether the account limit will be exceeded by the transaction at the time payment is expected to the merchant. If not, the response generator 220 produces an approval response at block 464; if so, the response generator 220 produces a denial response at block 468.

In the case of a debit transaction, the effect of the analysis is to provide an alternative to overdraft protection. The methods of the invention permit the financial institution 144 to identify circumstances in which an overdraft that appears apparent from the real-time approval ability of the architecture may nonetheless be avoided because of known delays in settlement processes. The value of such a service to customers 100 may be recognized by application of a fee when an approval is generated for a transaction despite the fact that an account does not at the time of the approval have sufficient funds. It is anticipated that such a fee would be less than a conventional overdraft fee.

In the case of a credit transaction, the effect of the analysis is to provide a mechanism for permitting individual transactions to cause a customer's normal credit limit to be exceeded. This does not result in an increase in the credit limit, as is sometimes done as an accommodation to customers in conventional arrangements, but instead merely acts as an exception to the existing credit limit. The analysis ensures that the decision to grant such an exception is made in a principled way that is supported by a payment history by the customer 100 that warrants an exception. Again, such a service has value to customers 100 and imposition of a service charge for granting an exception to the credit limit may be appropriate in some instances.

Completion of the transaction is triggered by returning the response produced by the response generator 220 to the merchant system 136 at block 472. In some embodiments, the response may be accompanied by supplementary information from the financial institution 144. Such supplementary information could include a statement for the customer 100 indicating that the account had insufficient funds but an accommodation was made based on the customer's history, could include details of any fees that may have been assessed, could include a loan agreement, or the like. At block 476, the merchant takes appropriate action to complete or terminate the transaction as indicated by whether an approval or denial response was received.

EXAMPLES

FIGS. 5A and 5B provide examples of account histories that illustrate how decisions may be made in considering a transaction request. FIG. 5A provides an example of a debit account, in this instance a checking account, while FIG. 5B provides an example of a credit account, in this instance a credit-card account.

The account history of FIG. 5A shows a number of regular patterns. The presence of regular patterns is generally expected to indicate a greater likelihood that a future balance of the account may be predicted and therefore a greater likelihood of a predictive authorization taking the form of an approval. These regular patterns include a consistent deposit history with weekly pay of exactly $500.00 being deposited every seven days. With such a history, the deposit analysis engine 208 is likely to conclude that a deposit of an additional $500.00 may be predicted with confidence exactly seven days after the last such deposit, i.e. that $500.00 will be deposited to the account on Apr. 26, 2006. Other regular patterns include consistent withdrawals from the account: every month, a car payment of $342.50 is made on the 12th, a mortgage payment is made on the 17th for $1244.62, and an insurance payment of $142.55 is made on the 20th. The withdrawal analysis engine 212 is thus similarly likely to forecast that these withdrawals will continue monthly on the same dates. Other patterns exist that have some regularity, but are not as regimented. For instance, a utility payment is made on the 10th of every month, but has an amount that varies from month to month. In this particular example, the trend is downwards from February at $150.22 to March at $124.07 to April at $108.44, perhaps reflecting decreased heating costs associated with warming temperatures. The withdrawal analysis engine 212 may thus forecast a withdrawal on May 10, estimating the amount to be an amount averaged over some period of time or an amount consistent with the downwards trend. Still other withdrawals do not show obvious trends by themselves, but may permit inferences by the withdrawal analysis engine 212 that incidental withdrawals of a certain amount every month are typical. In some instances, trends may not be apparent from weekly or monthly analyses, but manifest themselves when the analysis engines perform an analysis over a quarterly or yearly period.

The result of these various analyses is an understanding of the activity of this particular account, which is in general quite predictable. When the customer attempts to write a check on the account for the purchase of some electronics devices at an amount of $200.00 on April 25th, the account has insufficient funds to support the transaction. When the customer presents the check in that amount at the point of sale, the merchant system may nonetheless receive an approval response to a transaction request transmitted by the merchant system over a financial network. In this example, the approval response results from a determination that a suitable settlement window is 2 days, i.e. April 26-27, and that there is a very high probability of a deposit of $500.00 to the account on April 26, coupled with a low probability of significant withdrawals. This qualitative evaluation may be expressed quantitatively such as by using any of the measures discussed above and operated on by rules to determine that an approval should be generated to the response request. For instance, one algorithm might indicate that the expected average balance of the account over the April 26-27 period is $594.85±$50.00, even the full range of which is greater than the transaction amount of $200.00. Another algorithm might indicate to a 90% confidence level that the account balance over the April 26-27 period will exceed $560.00, again greater than the transaction amount of $200.00.

The credit account in the example of FIG. 5B shows significantly less predictability. The credit limit for the account in this example is $10,000. The payment history by the customer in this instance is somewhat regular, with a payment being made around the 3rd of each month, which is approximately an average of the actual payment dates. But the actual payment has been made as much as six days early and seven days late, making it somewhat difficult to narrowly predict when a payment will be received, particularly if the time window to be applied is significantly less than six or seven days. In addition, the payment amount itself is highly irregular, showing a mean amount of $1685.00 over the five months for which data are available, but having a standard deviation of $1558.00, nearly equal to the mean. The charge history is also generally erratic, although some aspects of it show some regularity. On the 17th of every month, $120.00 is charged for a health club membership and on the 23rd of every month, $185.00 is charged for monthly parking. Interest is assessed regularly on the 15th of every month, and while the amount varies somewhat, it is predictable from external data, i.e. by the policy of the financial institution that imposes the charge. The other charges include some frequency of restaurant charges that might be amenable to trend identification if a longer time period of data were available, but otherwise seem to exhibit little regularity.

When a customer attempts to use the credit card to purchase some new furniture for a transaction amount of $800.00 on September 29, the transaction amount would cause the account to go over its credit limit of $10,000. While a payment from the customer is generally expected soon, the date of the payment cannot be made with much confidence since it could be as soon as the same day to as late as October 10. Furthermore, the amount of the payment is uncertain since it could be a nominal amount that would be insufficient to bring the account balance back below its credit limit or could be thousands of dollars. While no specific regularly occurring charges are expected in the near future, the level of irregularity with which charges are made makes it difficult to exclude the possibility. The response to the transaction request in this example is thus a denial, notwithstanding certain positive payment features in the account history. The denial may result from a determination that a suitable analysis window is three days, i.e. September 30-October 2. One algorithm might generate a quantitative prediction that the account balance over those three days will average $9600±2000, reflecting a significant danger that the balance will not be lowered sufficiently to accommodate the transaction amount of $800. Another algorithm might generate a quantitative prediction that to a 90% confidence level the account balance will exceed $9350 over the three-day period, leaving insufficient credit below the credit limit to accommodate the $800 transaction amount.

These examples are merely intended to illustrate the types of trends that may be of relevance to the analyses and decisions to approve transaction authorization requests, and not to be limiting. Many other types of relevant trends may be identified using other techniques that may be useful to specific financial institutions.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method comprising:
   receiving an authorization request for a transaction over a network, the authorization request including account information and transaction information specifying at least a transaction amount;
   identifying a financial account from the account information;
   predicting future debiting and crediting of the account based on a history of the financial account;
   predicting a balance of the financial account based on the predicted future debiting and crediting of the account, the predicting the balance of the financial account including generating a payment window for at least one credit to the account, the payment window specifying a time period within which the at least one credit is expected;
   determining whether the predicted balance of the financial account is sufficient to support the transaction for the transaction amount, the determining based in part on the payment window; and
   generating an approval response to the authorization request based on the determining.

2. The method recited in claim 1 wherein:
   the financial account comprises a debit account; and
   the predicted balance of the financial account is greater than or equal to the transaction amount.

3. The method recited in claim 2 wherein the transaction comprises payment using a check drawn on the financial account.

4. The method recited in claim 2 wherein the account information includes an account number obtained by reading a magnetic-ink character-recognition ("MICR") line from the check.

5. The method recited in claim 2 wherein predicting future debiting and crediting of the financial account comprises analyzing records of deposits made to the financial account over a period of time to identify deposit trends to the financial account.

6. The method recited in claim 2 wherein predicting future debiting and crediting of the financial account comprises analyzing records of withdrawals made from the financial account over a period of time to identify withdrawal trends from the financial account.

7. The method recited in claim 1 wherein:
   the financial comprises a credit account; and
   a difference between a credit limit of the credit account and the balance of the financial account is greater than or equal to the transaction amount.

8. The method recited in claim 7 wherein predicting future debiting and crediting of the financial account comprises analyzing records of payments made to reduce the balance of the financial account to identify payment trends to the financial account.

9. The method recited in claim 7 wherein predicting future debiting and crediting of the financial account based on the history of the financial account comprises analyzing records of charges made to increase the balance of the financial account to identify charging trends to the financial account.

10. The method recited in claim 1 wherein:
    the transaction is for a purchase by a customer from a merchant; and
    the authorization request is received from the merchant, the method further comprising transmitting the approval response to the merchant.

11. The method recited in claim 1 further comprising transmitting the approval response over the network with a services application related to the financial account.

12. The method recited in claim 1, wherein authorization of the transaction comprises termination of the transaction.

13. The method recited in claim 1 wherein the predicting the balance of the financial account comprises predicting the balance of the financial account at a specified future time.

14. The method recited in claim 13 wherein the specified future time comprises a time interval.

15. The method recited in claim 14 wherein the predicting the balance of the financial account at the specified future time comprises predicting a minimum balance of the financial account over the time interval.

16. The method recited in claim 13 wherein the predicting the balance of the financial account at the specified future time comprises an estimate of a reliability of the prediction.

17. A system comprising:
    a communications device;

a processor;
a storage device; and
a memory coupled with the processor, the memory comprising a computer-readable medium having a computer-readable program embodied therein for directing operation of the system to process a transaction, the computer-readable program including:
instructions for receiving, with the communications device over a network, an authorization request for the transaction, the authorization request including account information and transaction information specifying at least a transaction amount;
instructions for identifying, with the processor, a financial account from the account information;
instructions for predicting, with the processor, future debiting and crediting of the financial account based on a history of the financial account;
instructions for predicting, with the processor, a balance of the financial account based on the predicted future debiting and crediting of the financial account, the predicting the balance of the financial account including generating a payment window for at least one credit to the account, the payment window specifying a time period within which the at least one credit is expected;
instructions for determining, with the processor, whether the predicted balance of the financial account is, sufficient to support the transaction for the transaction amount, the determining based in part on the payment window; and
instructions for generating, with the processor, an approval response to the authorization request based on the determining.

18. The system of claim 17 wherein:
the financial account comprises a checking account;
the predicted balance of the financial account is greater than or equal to the transaction amount;
the transaction comprises payment using a check drawn on the checking account; and
the account information includes an account number obtained by reading a magnetic-in character-recognition ("MICR") line from the check.

19. The system of claim 17 wherein:
the financial account comprises a credit account; and
a difference between a credit limit of the credit account and the predicted balance of the financial account is greater than or equal to the transaction amount.

20. The system of claim 17 wherein the instructions for predicting future debiting and crediting of the financial account comprise separate instructions for analyzing actions that increase the balance of the financial account and actions that decrease the balance of the financial account.

21. The system of claim 17 wherein:
the transaction is for a purchase by a customer from a merchant; and
the authorization request is received from the merchant,
the computer-readable program further includes instructions for transmitting the approval response to the merchant.

22. The system of 17 wherein the instructions for predicting, with the processor, the balance of the financial account comprise instructions for predicting, with the processor, a balance of the financial account at a specified future time.

23. The system of claim 22 wherein the specified future time comprises a time interval.

24. The system of claim 23 wherein the prediction of the balance of the financial account at the specified future time comprises a prediction of a minimum balance of the financial account over the time interval.

25. The system of claim 22 wherein the prediction of the balance of the financial account at the specified future time comprises an estimate of a reliability of the prediction.

26. A machine-readable medium having sets of instructions stored thereon which, when executed by a machine, cause the machine to:
generate a model of at least one characteristic of a financial object over time from historical information;
receive data defining an action to be taken with the financial object;
predict future debiting and crediting of the financial object based on the historical information;
predict a future state of the financial object based on the predicted future debiting and crediting, the predicting the future state including generating a payment window for at least one credit to the account, the payment window specifying a time period within which the at least one credit is expected;
predicting an effect of the action based on the input data and the predicted future state of the characteristic of the financial object, the predicting the effect of the action based in part on the payment window; and
decide whether to take the potential action based on the predicted effect.

27. The machine-readable medium recited in claim 26 wherein the financial object comprises a financial account.

28. The machine-readable medium recited in claim 27 wherein the characteristic of the financial object comprises a balance of the financial account and the future state of the characteristic comprises a predicted balance of the financial account.

29. The machine-readable medium recited in claim 28 wherein the historical information comprises a record of withdrawals of funds from the financial account.

30. The machine-readable medium recited in claim 27 wherein the historical information comprises a record of deposits of funds to the financial account.

31. The machine-readable medium recited in claim 27 wherein the action comprises approval of a transaction.

32. A method comprising:
receiving an authorization request for a transaction over a network, the authorization request including account information and transaction information specifying at least a transaction amount;
identifying a financial account from the account information;
predicting future debiting and crediting of the financial account based on a history of the financial account;
predicting, independently of a current balance of the financial account, a balance of the financial account based on the predicted future debiting and crediting of the financial account, the predicting the balance of the financial account including generating a payment window for at least one credit to the account, the payment window specifying a time period within which the at least one credit is expected;
determining whether the predicted balance of the financial account will support the transaction for the transaction amount, the determining based in part on the payment window; and
generating an approval response to the authorization request based on the determining.

* * * * *